Sept. 2, 1969 KATSUYUKI IWAI ET AL 3,465,098

FINE GAP AND COARSE GAP VIDEO MAGNETIC HEAD ARRANGEMENT

Filed Sept. 6, 1966 2 Sheets-Sheet 1

INVENTOR
KATSUYUKI IWAI
et al

FINE GAP AND COARSE GAP VIDEO MAGNETIC HEAD ARRANGEMENT

Filed Sept. 6, 1966 2 Sheets-Sheet 2

United States Patent Office 3,465,098

Patented Sept. 2, 1969

3,465,098

FINE GAP AND COARSE GAP VIDEO MAGNETIC HEAD ARRANGEMENT

Katsuyuki Iwai, Motonori Fukatsu, and Katsuya Atsumi, Tokyo, Japan, assignors to Akai Electric Co. Ltd., Tokyo, Japan Filed Sept. 6, 1966, Ser. No. 577,451
Claims priority, application Japan, Nov. 5, 1965, 40/67,677; Nov. 11, 1965, 40/69,008
Int. Cl. H04n 5/78
U.S. Cl. 178—6.6 4 Claims

ABSTRACT OF THE DISCLOSURE

Magnetic tape reproducing machines for wide freqency band signal reproduction are disclosed. The machines use various arrangements of a main and auxiliary reproducing head. The main reproducing head. The main reproducing head has a fine slit gap for the reproduction of higher frequency signals, while the auxiliary head has a coarser slit gap for the reproduction of lower frequency signals.

BACKGROUND OF THE INVENTION

Field of the invention

This invention relates generally to improvements in and relating to magnetic tape recording and reproducing machines for audio and video use, especially improved magnetic head arrangements thereof.

Description of the prior art

It is highly desirable to select the lowest possible tape running speed in magnetic tape recorders, so as to permit the largest possible volume of signal information with use of a predetermined length of the tape. Various and concerted efforts have been made in this area by those skilled in the art for the realization of so-called high-density recording. As an example, the cross-field system may be referred to.

Recently, therefore, serious attention has been directed to the problem of how to effectively reproduce this kind of high-densely recorded signal information from a tape so treated.

In order to reproduce such signal information as this, while using the lowest possible tape running speed, a very fine slit gap must be provided in the reproducing head. As is commonly known, higher frequency signals are best reproduced with the use of a reproducing head having a fine slit gap.

On the other hand, troubles and difficulties may arise in cases where much lower frequency signals should be reproduced as will be later more fully described.

This drawback is highly accentuated in the case of video tape recorders with which a still broader frequency band must be processed.

For this purpose, now available commercial video tape recorders employ rotary magnetic heads instead of stationary heads so as to operate at a higher relative tape speed. As is commonly known, the provision of rotary heads results in a highly complicated tape reeling mechanism in addition to insufficient and non-even contact of the heads with the running tape. Furthermore, complicated servo mechanisms must be provided. Such conventional systems are quite complex presenting many mechanical difficulties. In order to avoid this kind of drawback, frequency modulation technique have been employed, but these generally involve highly complicated circuit arrangements in the machines.

Brief description of the invention

The main object of the present invention is to provide an improved magnetic head arrangement on a magnetic tape recorder, capable of reproducing highly-dense recorded signal information such as video signals with the use of stationary magnetic heads in a highly simplified manner.

Starting from the above-mentioned known technique of the tape recorder, the present invention is characterized by the provision of a main magnetic reproducing head and an auxiliary magnetic reproducing head, said heads having a finer and a coarse slit gap, respectively, for reproducing a higher and a lower frequency signal range from one and the same recorded track of a magnetic tape, said ranges being overlapped slightly with each other on a frequency spectrum covering the whole frequency band to be treated with the recorder.

Detailed description of the invention

Figure 7:
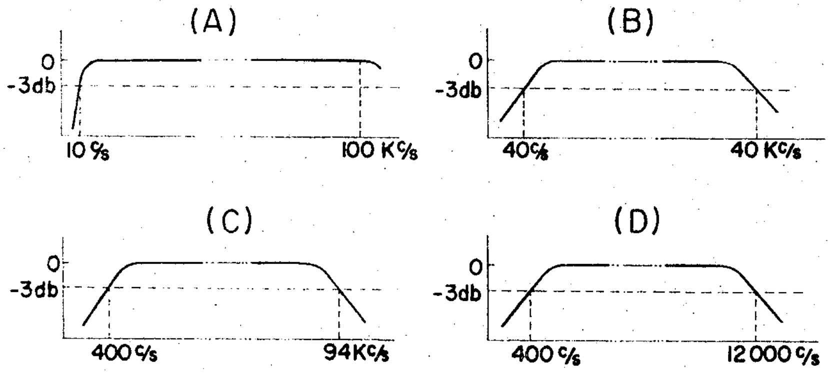

As a prelimiary and introductory description, the relation between the reproducing slit gap and the frequency response will now be more specifically given in the case of the audio technique with reference to FIG. 7 of the accompanying drawings.

Assuming that the tape running speed is 7½ in. per second and the reproducing slit gap be in the order of 1$\mu$ for reproducing signals ranging from 10 c./s. to 100 kc./s. from a recorded track of a magnetic tape which has been successfully and evenly recorded with such signal frequency range, as seen in FIG. 7 at A, the maximum possible frequency to be reproduced will be 94 kc./s. as illustrated in FIG. 7 at C. In this case, the lowest possible frequency to be effectively reproduced will be as high as 400 c./s. When the slit gap is enlarged to 2$\mu$ for avoiding this inconvenience, the lowest possible frequency to be effectively reproduced will be reduced to 40 c./s. while the corresponding highest possible frequency will be disadvantageously reduced to about 40 kc./s. as schematically illustrated in FIG. 7 at B.

It could thus be safely concluded that with reduction of slit gap to ½ the former size, the maximum reproducible signal frequency will increase to about two times the former attainable maximum frequency, while at the same time the lowest reproductible frequency will increase to as high as about 10 times, which means that the lower adubile frequency signals will be lost.

In FIG. 7 at D, similar and more accentuated influence of the reproducing slit gap on signal reproduction is shown in the case of a tape speed of 1$\frac{5}{16}$ in. per second.

This drawback is further accentuated when to the video tape recording techniques. In this case, synchronizing signals will frequently be lost in the course of reproduction which causes non-clear, and fluctuating pictures to be reproduced.

Next, referring to FIGS. 1–7, a first embodimnet of the invention will be described hereinbelow.

Figure 1:
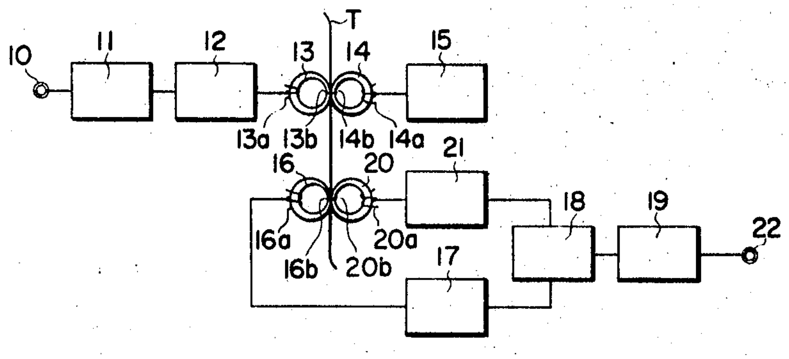
FIGS. 1, 2 and 3 schematic block diagrams of a first embodiment of the invention for audio use, wherein FIG. 1 additionally includes a recording system to facilitate an understanding of the invention.

In FIG. 1, numeral 10 denotes an input terminal electrically connected with a conventional audio signal current source, for instance a microphone of a magnetic tape recording and reproducing machine in which the present system is embodied.

The audio signal is then supplied to a preamplifier 11, which may be a conventional design and thus only schematically illustrated in the form of a rectangular block, the preamplification being carried out for the proper compensation of frequency characteristics of the input signal as commonly known to those skilled in the art. The compensatingly processed output signal is further bed to a recording amplifier 12 which may be of conventional design and is illustrated herein again in a simplified manner. The amplified signal is then supplied to the recording coil as at 13*a*, of a magnetic record head 13 again of conventional design, for magnetically recording on an elongated recording magnetic medium, preferably magnetic tape T illustrated herein in a highly simplified manner, the record gap 13*b* of the head 13 being kept in sliding contact with the magnetic layer of the tape as conventionally. 14 denotes a biasing magnetic head of any known design and provided with a biasing coil 14*a* and a biasing slit gap 14*b* which is selected to be considerably larger than that denoted by 13*b*. This biasing head 14 is normally kept at a short distance, say, in the order of 1 mm. or more, from the back surface of the tape T, although in the drawing the head 14 is shown only schematically, as if it were kept in contact with the tape for simplicity. The coil 14*a* is electrically connected with a high frequency biasing current source 15 which may be again of conventional design and is schematically shown only in a rectangular block. In place of this "cross-field" system, however, the D.C.-biasing technique may also be employed. Further, the A.C.- or D.C.-biasing current may be supplied directly to the recording coil 13*a* in an overlapped manner, when necessary in place of using the separately provided biasing head. However, the first mentioned high frequency cross-field system is highly recommended for sharply and effectively recording higher frequency input signals.

A representative frequency spectrum is shown in FIG. 7 at A which will be self-explanatory.

In FIG. 1, numeral 16 denotes a main playback or reproducing head having a pick-up coil 16*a* and a reproducing slit gap 16*b* which may be in the order of, say, 1–2$\mu$, the coil 16*a* being electrically connected to a preamplifier 17 of conventional design. The reproducing gap 16*b* is kept in sliding contact with the magnetic layer of the tape T. The amplified output signal from the preamplifier 17 is then fed to an electronic mixer 18 of conventional design.

An auxiliary playback or reproducing head 20 of conventional design and having a pick-up coil 20*a* and a reproducing slit gap 20*b* preferably in the order of 30–50$\mu$, is provided so as to be kept substantially in an opposed relation to the main head 16 and in sliding contact with the back of the tape T. The slit gap 20*b* may be so designed to effectively pick up the signals of 40–400 c./s. by way of example, while the main slit gap 16*b* may serve for higher frequency signals of 400–1200 c./s. as an example, when the tape running speed is assumed to be 1⅞ in. per second.

Figure 6:
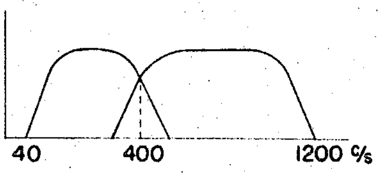
FIGS. 6 and 7 are frequency spectrums for an explanation of the nature of the inventive technique and the prior art, respectively.

In FIG. 6, respectively operative frequency zones of the both heads 16 and 20 are illustrated only by way of example.

The output signal from the auxiliary playback head is conveyed through preamplifier 21 to the mixer 18 wherein the supplied signal is mixed with the output from the preamplifier 17. This mixed signal is then processed by a conventional equalizer 19 and fed through output terminal 22 to a loud speaker (not shown). It will be readily understood that the mixing characteristics of the mixer 18 are so selected as to include the maximum possible frequencies shown in FIG. 7 at B and C.

Figure 2:
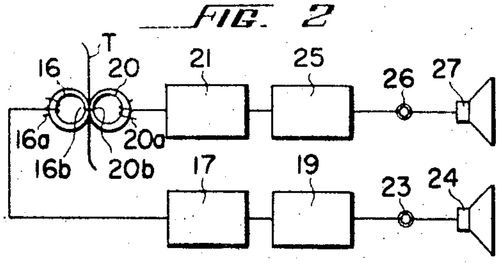

In a modified embodiment shown in FIG. 2, numerals 16, 16*a*, 16*b*, 17, 19, 20, 20*a*, 20*b* represent similar constituents referred to hereinbefore. It will be understood that the mixer 18 has been completely dispensed with.

In this modification, the main amplified signal output comprising higher frequency signal components and delivered from preamplifier 17 is directly supplied to the equalizer 19 and the thus processed signal is fed through a terminal 23 to a first loud speaker 24. On the other hand, lower frequency signal components picked-up by the auxiliary head 20 is fed through preamplifier 21, equalizer 25 and terminal 26 to a second loud speaker 27. Thus, the mixing process of the higher and lower frequency signal components is carried into effect in a kind of the stereo effect.

Figure 3:
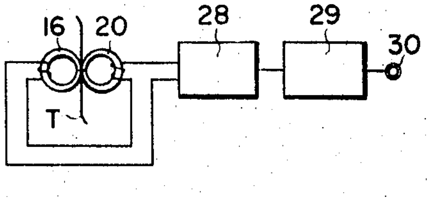

In a further modified arrangement shown in FIG. 3, the higher frequency signal components picked-up by the main reproducing head 16 are mixed or overlapped with lower frequency signal components picked-up by the auxiliary reproducing head 20 and the thus combined signal is fed through preamplifier 28, equalizer 29 and output terminal 30 to a single loud speaker (not shown).

In FIGS. 2 and 3, the heads 16 and 20 are kept in slidable contact with the magnetic layer and the non-magnetic base of the tape T, respectively, as in FIG. 1.

Figure 4:
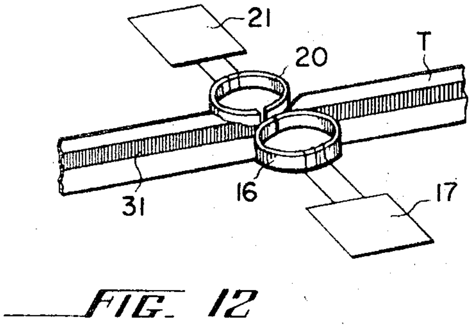
FIG. 4 is a schematic perspective view of essential parts of the embodiment shown in FIG. 1.

In FIG. 4, a part of the first embodiment shown in FIG. 1 is schematically illustrated in a substantially perspective view. From this figure, it will be clearly seen that both heads 16 and 20 are operative with a common track 31 on the magnetic tape T.

Figure 5:
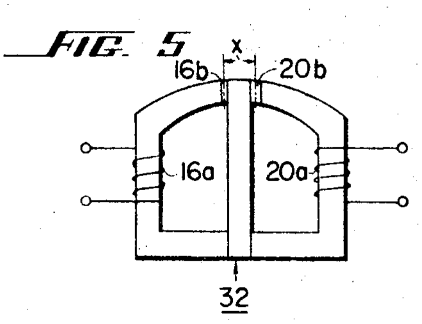
FIG. 5 is a top plan view of a modified embodiment of the invention, formed in a unitary assembly comprising two head elements adapted for operation with higher and lower signal ranges.

In a modified embodiment of the reproducing magnetic head shown in FIG. 5, a head assembly 32 is formed in a unit, comprising main and auxiliary reproducing head elements having slit gaps 16*b* and 20*b*, respectively, adapted for reproducing respective higher and lower frequency signal components, as well as pick-up coils 16*a* and 20*a* serving the same purposes. The gaps 16*b* and 20*b* are separated a predetermined distance "x" from each other. Now assuming that the picked-up higher frequency signal component is 1 kc./s. and the lower one is 50 c./s., there will be no appreciable disturbance to the human ears, even when there is a time lag of 75 ms. as determined by our intensive practical experiments. This mutual distance will amount to 1.65 mm. when the tape running speed is taken to be 1$\frac{5}{16}$ in. per second which is the lowest one in presently available commercial magnetic tape recorders. This distance should naturally be varied with different tape running speeds from that above specified.

Figure 8:
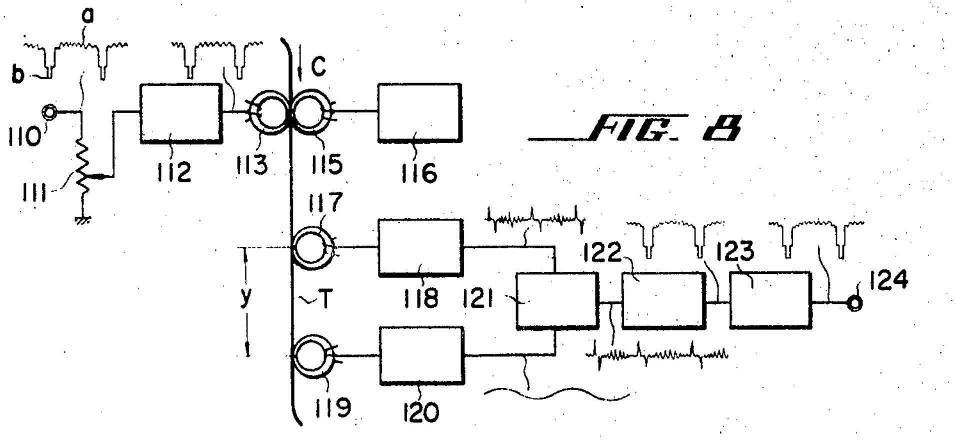
FIG. 8 is a schematic block diagram showing a second embodiment of the invention adapted for video use.

A second embodiment shown in FIG. 8 is similar substantially to that shown in FIG. 1.

In this embodiment, 110 denotes an input terminal which is electrically connected with a television receiving set (not shown) for receiving a video input signal as shown, of which *a* denotes a video signal component and *b* represents a synchronizing signal component. Numeral 111 represents a variable resistor inserted in the input circuit for the adjustment of the input signal level as in the conventional way. The input video signal is amplified in a record amplifier 112 and then fed directly to a record head 113 for being recorded on the magnetic tape T. This record head 113 is fixedly mounted on a stationary chassis panel (not shown) of a video tape recorder, instead of employing a conventional rotary head. The mounting means for the head is not shown in the drawing for the sake of simplicity. 115 denotes a biasing head which is similar to that shown in FIG. 1 by 14 and is connected electrically with a biasing oscillator 116 which is similar to 15.

Figure 9:
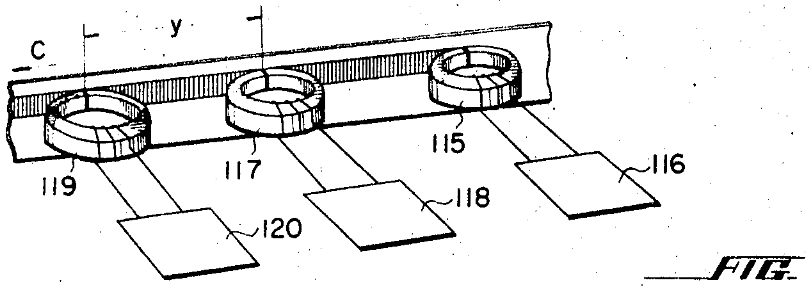
FIG. 9 is a schematic perspective view illustrating essential parts of the embodiment shown in FIG. 8.

There are provided a main reproducing head 117 and an auxiliary reproducing head 119 which are kept at a predetermined distance *y* from each other, as shown in FIG. 9. These heads 117 and 119 are also of the stationary type. 118 and 120 are preamplifiers similar to 17 and 21 in the preceding embodiment shown in FIG. 1 and 121 denotes a mixer similar to 18, which is connected electrically in succession with equalizer 122, direct current restoration circuit 123 and output terminal 124, all of which may be of conventional design.

Figure 10:
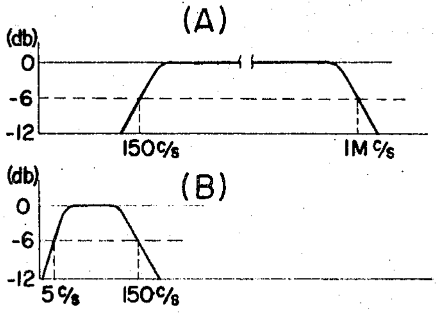
FIGS. 10–12 are schematic diagrams for the illustration of the principles embodied in the second embodiment of the invention.

The main head 117 is designed and arranged for the pick-up of a higher frequency signal range between 150 c./s. and 1 mc./s., shown in FIG. 10 at A by way of example. The auxiliary head 119 is designed and arranged for the pick-up of a lower frequency signal range between 5–150 c./s., shown in FIG. 10 at B by way of example.

In the embodiment shown in FIGS. 8 and 9, the main head 117 is advanced relative to the auxiliary head 119 when seen in the tape running direction shown by a small arrow C in FIGS. 8 and 9, respectively. A reversed arrangement of the two heads will serve the desired purpose with equal results.

The distance *y* is selected to a value corresponding to either a field of television picture, or that multiplied by *n* which is an integer, preferably 1–4. When expressed in practical value, the distance *y* may preferably be 25–100 mm. with a tape running speed of 60 in./sec.

The recording of television signals by the heads 113 and 115 on the tape T may be carried out in the similar way as referred to in the foregoing with reference to FIGS. 1 and 4.

The reproduction from the tape by means of reproducing heads 117 and 119 may be also carried out in the similar way as was referred to hereinbefore with reference to FIG. 1.

For further guidance in understanding the present embodiment, signal models appearing at several places in the arrangement are also shown schematically.

Figure 11:
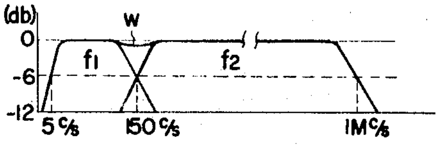

The overlapping region of the respective signal frequency regions *f*1 and *f*2 as processed by the heads 117 and 119 and synthesized in the mixer 121 may not be flat as exemplified by *w* in FIG. 11. According to our experiments, this does not affect in any appreciable way the reproduced pictures when the reproducing system is based upon the direct current restoration principle as will be more fully described hereinbelow.

Now referring back to FIG. 8, the output signal from the mixer 121 is processed in the equalizer 122 in the form of a kind of integrated signal. The output signal is then fed to D.C.-restoration circuit 123 and delivered through output terminal 124 to a television receiving set (not shown) for projecting reproduced pictures in the conventional way.

The distance *y* between the heads 117 and 119 in the arrangement shown in FIGS. 8 and 9 may amount to about 90–0.29 mm. when 60 in. per second is taken as the tape running speed, said distance value corresponding to 1–3H in terms of television engineering terminology.

Figure 12:
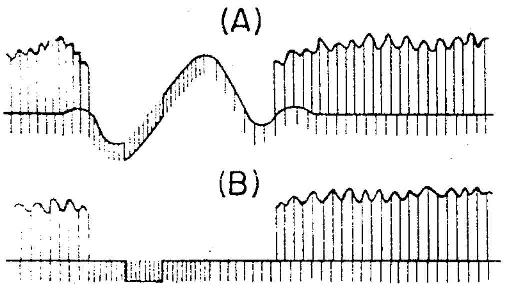

In FIG. 12 at A and B, reproduced video signal models are illustrated in a comparative way of the present invention with the prior art, in the form of frequency response. According to the prior art, the synchronizing signal is considerably distorted on account of insufficient reproduction of lower frequency signals. On a sharp contrast thereto, with the reproduced video signal according to the present invention, the synchronizing signal has been regularly reproduced in a non-distorted manner.

This remarkable results have been obtained at a lower relative tape speed of 60 in. per second and with use of stationary reproducing heads as was specifically described hereinbefore. Furthermore, the recording system does not use rotary heads and no frequency modulation means are provided. Thus, in the reproducing system, no F.M.-demodulator has been fitted as was referred to hereinbefore.

A latitude of modification, change and substitution is intended in the foregoing disclosure and in some instances some features of the invention will be employed without a corresponding use of other features.

Of course it should be understood that there may be various different embodiments of the device without departing from the scope of the present invention.

Having now particularly described and ascertained the nature of our said invention, and in what manner the same is to be performed, we declare that what we claim is:

1. In a video magnetic reproducing head arrangement adapted for cooperation with a travelling elongated magnetic tape once recorded and kept in sliding contact therewith in a magnetic recording and reproducing machine, the provision of a main magnetic reproducing head fixedly mounted on said machine and an auxiliary magnetic reproducing head fixedly mounted on said machine at a predetermined distance from said main head corresponding to the time interval of the television picture frame multiplied by an integer *n*, said heads respectively having a finer and a coarser slit gap for reproducing a higher and a lower frequency signal range from one and the same recorded track of the magnetic tape, said ranges being overlapped slightly with each other on a frequency spectrum covering the whole frequency band to be treated with said machine.

2. The head arrangement as set forth in claim 1, further comprising a mixer circuit provided for mixing together the output signals from said both heads in an electronic manner.

3. The head arrangement as set forth in claim 1, wherein *n* has a value between 1 and 4.

4. The head arrangement as set forth in claim 2, further comprising an equalizer circuit connected to the output of said mixer circuit to provide an integrated output of the mixed signals, and a D.C.-restoration circuit receiving said integrated output and providing an output for a television receiving set.

References Cited

UNITED STATES PATENTS

| | | | |
|---|---|---|---|
| 2,416,279 | 2/1947 | Begun | 179—100.2 |
| 2,803,708 | 8/1957 | Camras | 179—100.2 |
| 3,070,670 | 12/1962 | Eldridge et al. | 179—100.2 |

FOREIGN PATENTS

| | | |
|---|---|---|
| 1,032,565 | 6/1958 | Germany. |
| 1,060,157 | 6/1959 | Germany. |
| 1,209,600 | 2/1965 | Germany. |

BERNARD KONICK, Primary Examiner

JEROME P. MULLINS, Assistant Examiner

U.S. Cl. X.R.

179—100.2